United States Patent
Yu

(10) Patent No.: US 10,534,420 B2
(45) Date of Patent: Jan. 14, 2020

(54) ELECTRONIC DEVICES, ELECTRONIC SYSTEMS, AND CONTROL METHODS THEREFOR

(71) Applicant: Quanta Computer Inc., Taoyuan (TW)

(72) Inventor: Chun-Jie Yu, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 264 days.

(21) Appl. No.: 15/604,872

(22) Filed: May 25, 2017

(65) Prior Publication Data

US 2018/0181182 A1     Jun. 28, 2018

(30) Foreign Application Priority Data

Dec. 23, 2016  (TW) .............................. 105142900 A

(51) Int. Cl.
| | | |
|---|---|---|
| *G06F 1/32* | (2019.01) | |
| *G06F 1/324* | (2019.01) | |
| *G06F 1/3212* | (2019.01) | |

(52) U.S. Cl.
CPC ............ *G06F 1/324* (2013.01); *G06F 1/3212* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; G06F 1/263; G06F 1/3212; H04L 12/12; H04L 12/10; H02J 7/04
See application file for complete search history.

(56) References Cited

U.S. PATENT DOCUMENTS

| | | | |
|---|---|---|---|
| 9,280,196 B2 | 3/2016 | Yu et al. | |
| 9,618,990 B2 | 4/2017 | Lu et al. | |
| 2012/0139500 A1* | 6/2012 | Ye .......................... | H02J 7/0068 320/135 |
| 2014/0181551 A1* | 6/2014 | Rahal-Arabi ......... | G06F 1/3212 713/322 |

(Continued)

FOREIGN PATENT DOCUMENTS

| | | |
|---|---|---|
| CN | 101593015 A | 12/2009 |
| TW | 201319796 A1 | 5/2013 |
| TW | 201500907 A | 1/2015 |

OTHER PUBLICATIONS

Chinese language office action dated Sep. 27, 2017, issued in application No. TW 105142900.

(Continued)

*Primary Examiner* — Zahid Choudhury
(74) *Attorney, Agent, or Firm* — McClure, Qualey & Rodack, LLP

(57) ABSTRACT

An electronic device is provided. The electronic device includes a first processor, a power supplier, and a controller. A power supplier storing electricity provides power to the electronic device. The controller detects remaining electricity quantity of the power supplier and determines whether the current remaining electricity quantity is larger than an electricity-quantity threshold. When the controller determines that the current remaining electricity quantity is not larger than the electricity-quantity threshold, the controller activates a frequency control operation to control an operation frequency of the first processor.

20 Claims, 8 Drawing Sheets

(56) References Cited

U.S. PATENT DOCUMENTS

| | | | |
|---|---|---|---|
| 2014/0355308 A1* | 12/2014 | Uan-Zo-Li | H02M 1/32 363/15 |
| 2015/0006925 A1* | 1/2015 | Branover | G06F 1/3206 713/320 |
| 2015/0293569 A1* | 10/2015 | Yu | G06F 1/263 713/300 |

OTHER PUBLICATIONS

Chinese language office action dated Nov. 29, 2017, issued in application No. TW 105142900.

* cited by examiner

| voltage boosting operation | real power consumption ≧ system rated power protection point (SDPP, 85%) | real power consumption < system rated power protection point (SDPP, 85%) |
|---|---|---|
| activated | AC supply+DC supply | AC supply, and charging 103 depending the remaining electricity-quantity |
| inactivated | only AC supply | AC supply, and charging 103 depending the remaining electricity-quantity |

FIG. 4

| underclocking stage | underclocking for CPU | underclocking for GPU |
|---|---|---|
| T0 | Inactivated | Inactivated |
| T1 | Inactivated | Activated |
| T2 | Activated | Inactivated |
| T3 | Activated | Activated |

FIG. 7

ELECTRONIC DEVICES, ELECTRONIC SYSTEMS, AND CONTROL METHODS THEREFOR

CROSS REFERENCE TO RELATED APPLICATIONS

This Application claims priority of Taiwan Patent Application No. 105142900, filed on Dec. 23, 2016, the entirety of which is incorporated by reference herein.

BACKGROUND OF THE INVENTION

Field of the Invention

The invention relates to an electronic device, and more particularly to a control method for eliminating transient noise induced by the switching of a system load of the electronic device and providing over-power protection.

Description of the Related Art

In recent years, a smart battery charger can calculate ideal real system power consumption of an electronic device charged by the smart battery charger. Smartphones have become popular electronic devices (the ideal real system power consumption=total system power consumption). Through considering the ideal real system power consumption calculated by the smart battery charger and calculating the time delay induced by the system power consumption, an estimated system power consumption can be obtained for adjustment of the system power consumption and control policy of the performance. However, when an electronic device operates, the estimated system power consumption may be affected by impedance effect and frequency response induced by resistors, capacitors, inductors of the circuit, which results in a difference between the estimated system power consumption and the ideal real system power consumption. Thus, a fixed compensation value of a static compensation manner is applied to reduce the above difference.

However, during an operation, the electronic device cannot be at a stable loading state continuously. The real loading/power consumption of the system changes with the switching of the works or applications (such as word processing and web browsing) which are activated by the user. In this case, the estimation of the system power consumption has to be performed by considering the total system power consumption and the transient noise related to the transient response. Unfortunately, the equivalent circuit composed of the resistors, capacitors, inductors may induce overshooting, which results in that the difference between the estimated system power consumption and the ideal real system power consumption becomes greater. The fixed compensation value of the static compensation manner cannot reduce the above difference effectively, which increases the probabilities of the occurrences of the excessive response and the error operation in the over power protection.

BRIEF SUMMARY OF THE INVENTION

The invention provides an electronic device and a control method therefor for decreasing the probability of the occurrence of an error operation in an over power protection induced by the noise of the transient response.

An exemplary embodiment of an electronic device is provided. The electronic device comprises a first processor, a power supplier, and a controller. A power supplier storing electricity provides power to the electronic device. The controller detects remaining electricity quantity of the power supplier and determines whether the current remaining electricity quantity is larger than an electricity-quantity threshold. When the controller determines that the current remaining electricity quantity is not larger than the electricity-quantity threshold, the controller activates a frequency control operation to control an operation frequency of the first processor.

An exemplary embodiment of an electronic system is provided. The electronic system comprises an electronic device and a charger. The electronic device comprises a first processor, a power supplier, and a controller. The power supplier stores electricity to provide power to the electronic device. The controller detects remaining electricity quantity of the power supplier and determines whether the current remaining electricity quantity is larger than an electricity-quantity threshold to generate a control signal. The charger provides power to the electronic device and activates or inactivates a voltage turbo boost/buck operation, which is performed on the electronic device, according to the control signal. When the controller determines that the current remaining electricity quantity is not larger than the electricity-quantity threshold, the controller generates the control signal to inactivate the voltage turbo boost/buck operation and activate a frequency control operation to control an operation frequency of the first processor.

An exemplary embodiment of control method is provided. The control method comprises the steps of detecting remaining electricity quantity of a power supplier of an electronic device; determining whether the current remaining electricity quantity is larger than an electricity-quantity threshold; and activating a frequency control operation to control operation frequencies of a plurality of processors of the electronic device when the current remaining electricity quantity is not larger than the electricity-quantity threshold.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 is a schematic view showing relationship between a voltage boosting operation and real power consumption;

FIG. 7 shows various underclocking stages of the frequency control operation.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
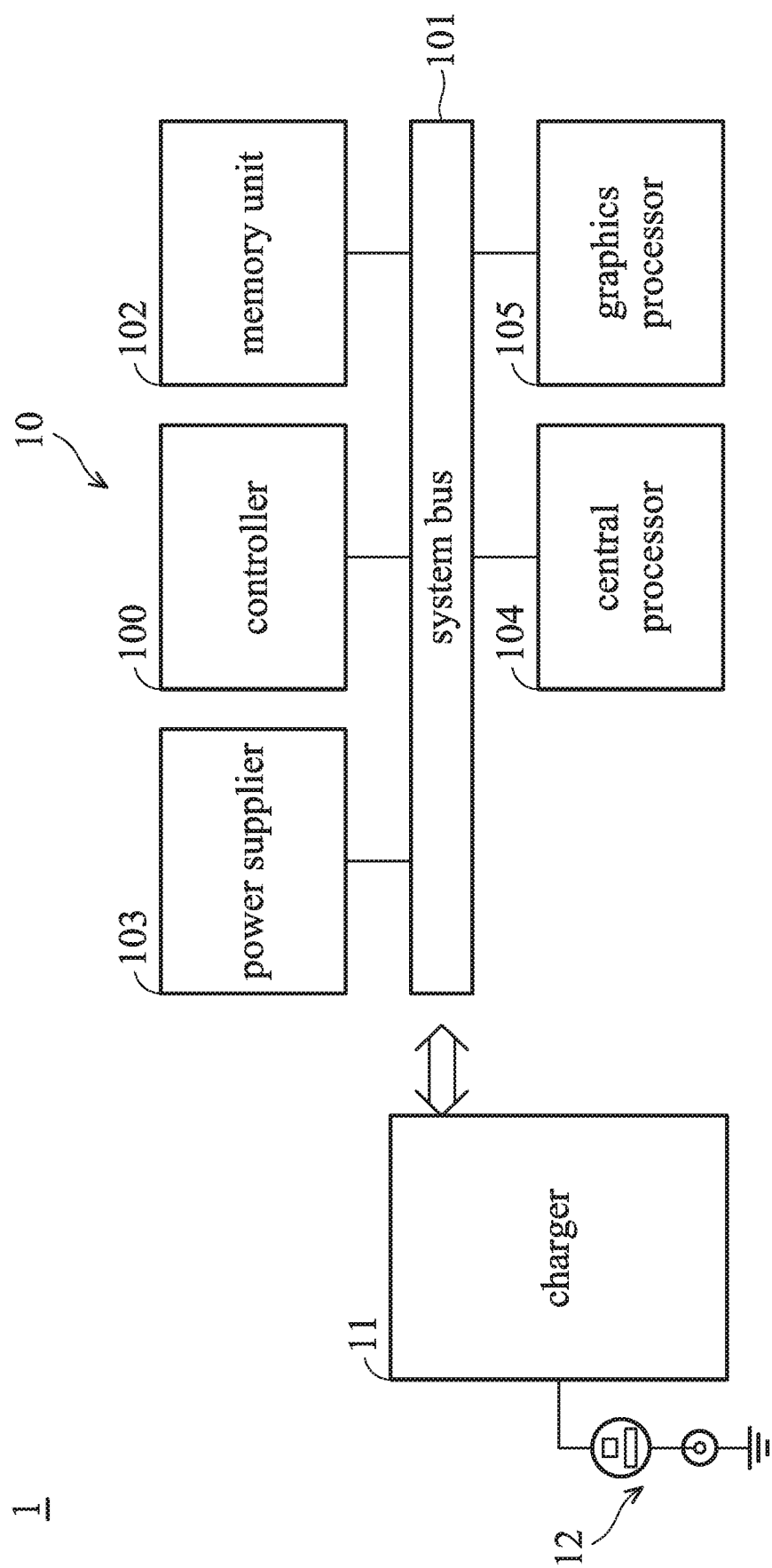
FIG. 1 shows an exemplary embodiment of an electronic system.

FIG. 1 shows an exemplary embodiment of an electronic system. The electronic system 1 comprises an electronic device 10 and a charger 11. The electronic device 10 is a digital camera, a smartphone, a desktop computer, or a notebook. The electronic device 10 can be implemented by one or more chips (such as system on chip (SOC)). As shown in FIG. 1, the electronic device 10 comprises a controller 100, a memory unit 102, a power supplier 103, and a plurality of processors. The controller 100 can be a microprocessor and provide related functions which will be described in the following when the controller 100 executes program codes or software. The processors of the electronic device 10 can be implemented by various circuits or hardware, such as hardware circuits or general hardware (such as a single processor, a multi-processor with capability of parallel processing, a graphics processor, and/or other processor with computing capability) and provide related functions which will be described in the following when the processors execute program codes or software. In the embodiment, the electronic device 10 comprising a central processor 104 and a graphics processor 105 is given as an example. The controller 100, the memory unit 102, the power supplier 103, the central processor 104, and the graphics processor 105 communicate with each other through a system bus 101. The memory unit 102 may comprises a volatile memory and/or a non-volatile memory. The volatile memory can be a dynamic random access memory (DRAM) or a static random access memory (SRAM). The non-volatile memory can be a flash, a hard disc drive, a solid-state disk (SSD), and so on. For example, the program codes of the application programs applied on the electronic device 10 can be stores in the non-volatile memory of the memory unit 102 in advance. The controller 100, the central processor 104, and the graphics processor 105 can load the program codes of the application programs into the volatile memory from the non-volatile memory and execute the program codes. The controller 100 operates to control the underclocking operations for the central processor 104 and the graphics processor 105. For each of central processor 104 and the graphics processor 105, the underclocking operation is performed to decrease the corresponding operation frequency.

The power supplier 103 can be a replaceable battery which is disposed in the electronic device 10 or an embedded battery of the electronic device 10. The power supplier 103 can be charged by the charger 11 which is disposed on the outside of the electronic device 10 for storing electricity. When the power supplier 103 stores electricity, the power supplier 103 can provide power to the electronic device 10. In addition to the power supplier 103, the charger 11 can directly provide power to the electronic device 10. In other words, the electronic device 10 can receive the power from both of the power supplier 103 and the charger 11 simultaneously or receive the power from one of the power supplier 103 and the charger 11. The operation of the electronic system 1 will be described in the later paragraphs.

Figure 2:
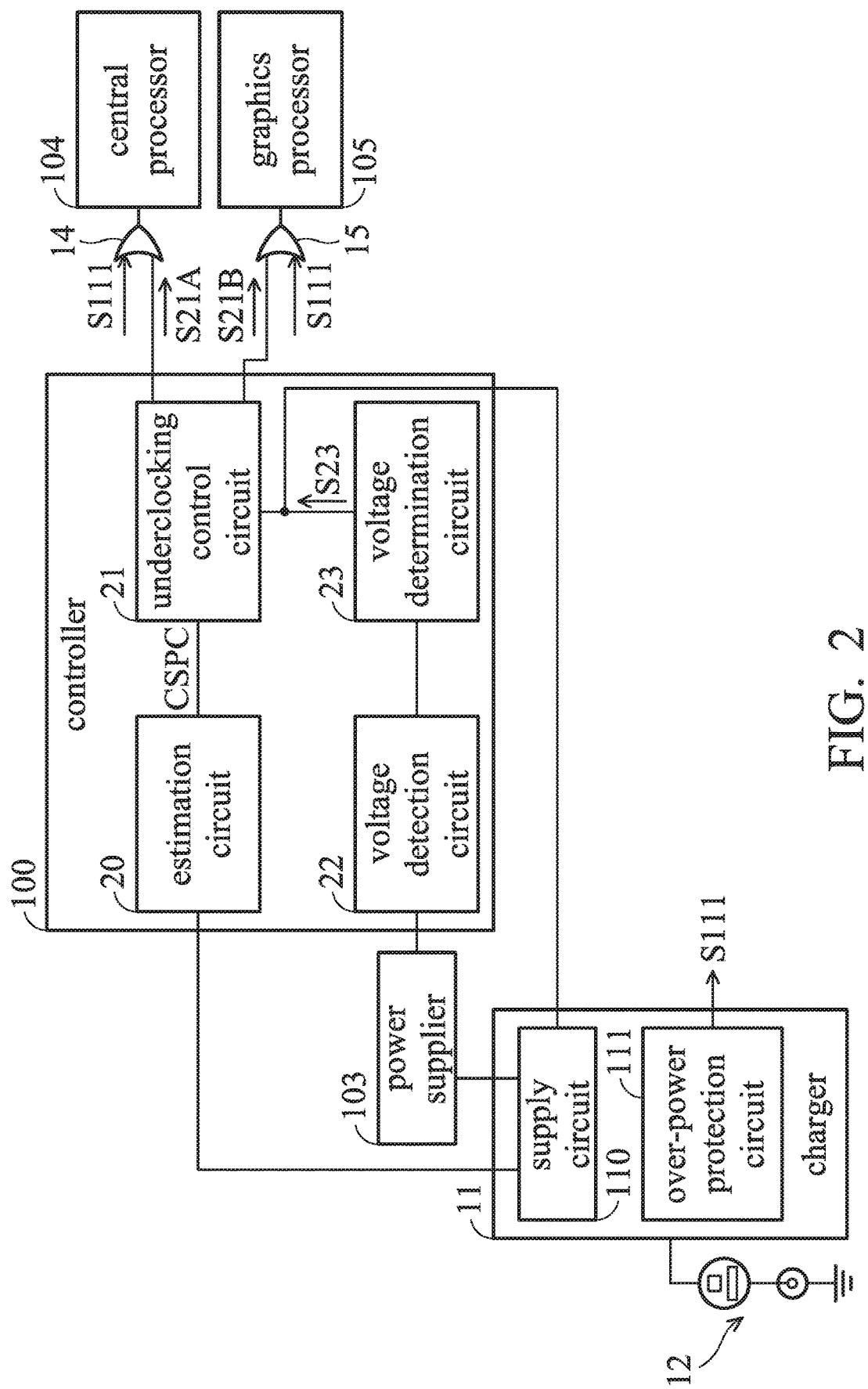
FIG. 2 shows an exemplary embodiment of a controller.

FIG. 2 shows an exemplary embodiment of the controller 100. Referring to FIG. 2, the controller 100 comprises an estimation circuit 20, an underclocking control circuit 21, a voltage detection circuit 22, and a voltage determination circuit 23. In FIG. 2, in additional to the controller 100, the charger 11 is also shown to clearly illustrate the embodiment. The charger 11 comprises a supply circuit 110 and an over-power protection circuit 111. As shown in FIG. 2, the charger 11 is coupled to a power adaptor 12. The supply circuit 110 provides power to the electronic device 10 according to the output power of the power adaptor 12. Thus, according to the voltage and current provided to the electronic device 10, the supply circuit 110 can obtain the real power consumption of the electronic device 10. The estimation circuit 20 of the controller 100 retrieves the real power consumption of the electronic device 10 from the charger 11 and compensates for the real power consumption by a static compensation value to obtain the current system power consumption (CSPC) of the electronic device 10. In the embodiment, the static compensation value is a value which is obtained for compensation for the power consumption when the electronic device 10 is at a system stable state (such as a shutdown state or standby state). Moreover, the supply circuit 110 can also charge the power supplier 103 of the electronic device 10, such as a battery.

Referring to FIG. 2, the electronic device 10 further comprises OR gates 14 and 15. In the embodiment of FIG. 2, the OR gates 14 and 15 are disposed on the outside of the controller 100. One input terminal of the OR gate 14 receives a underclocking control signal S21A from the underclocking control circuit 21, and the other input terminal thereof receives a protection signal S111 from the over-power protection circuit 111 of the charger 11. One input terminal of the OR gate 15 receives a underclocking control signal S21B from the underclocking control circuit 21, and the other input terminal thereof receives the protection signal S111. The protection signal S111 is pre-set to a disable state (low voltage level). When the over-power protection circuit 111 determines that the real power consumption is larger than or equal to a power protection point (PP), the protection signal S111 is switched to an enable state (high voltage level). In the embodiment, the power protection point (PP) is set to be 120% of the rated output power (such as 45 W) of the power adaptor 12, that is 54 W.

Figure 3:
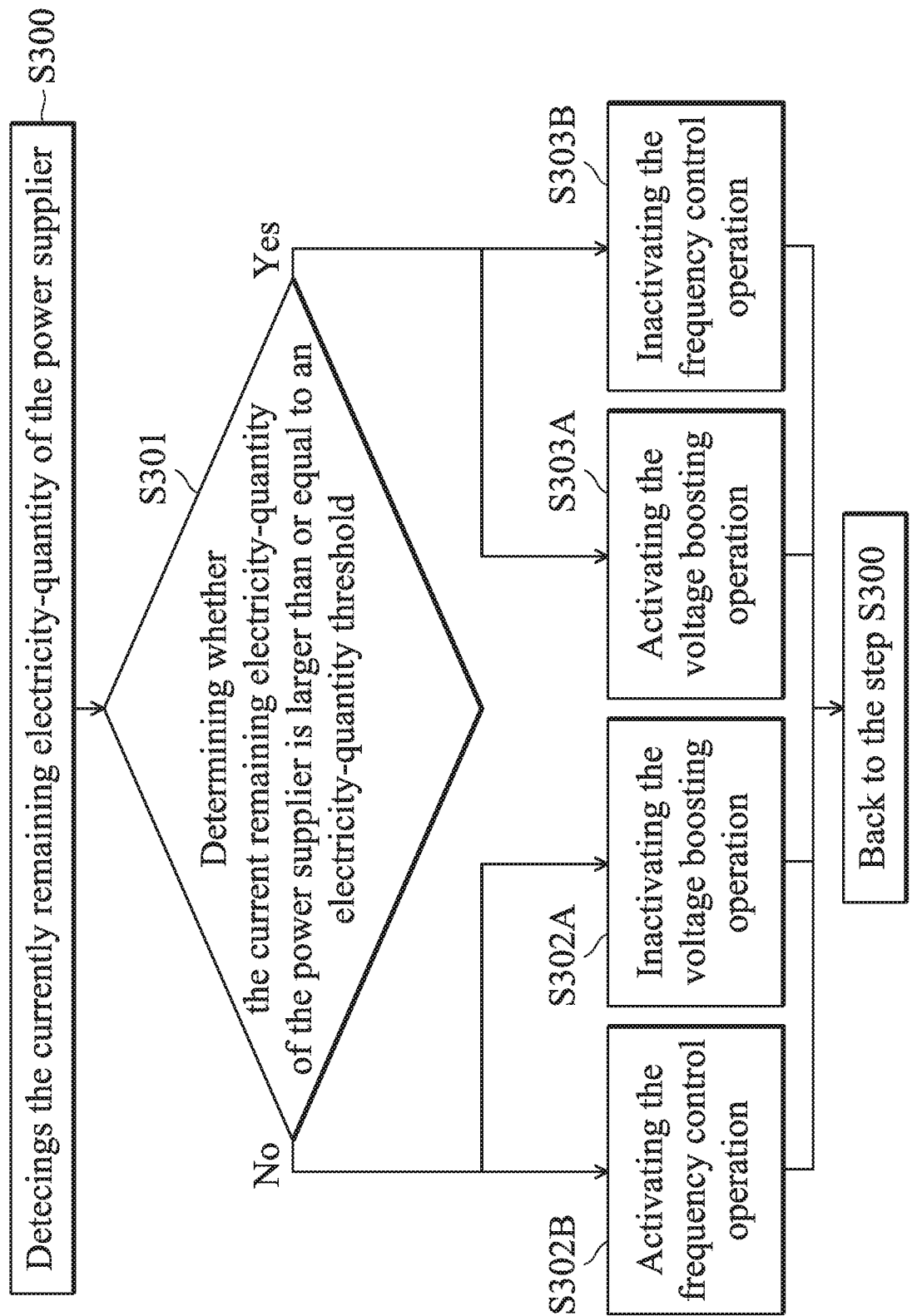
FIG. 3 shows a flow chart of an exemplary embodiment of a control method.

FIG. 3 shows a flow chart of an exemplary embodiment of a control method. The control method of the embodiment can be applied to implement over-power protection to the electronic device 10 and decrease the probability of the occurrence of the error operation in the over power protection. Referring to FIGS. 2 and 3, in the step S300, the voltage detection circuit 22 detects the current remaining electricity quantity of the power supplier 103 (that is the number of charges currently stored in the power supplier 103). Then, the voltage determination circuit 23 determines whether the current remaining electricity quantity of the power supplier 103 is larger than or equal to an electricity-quantity threshold (step S301). When the voltage determination circuit 23 determines that the current remaining electricity quantity of the power supplier 103 is not larger than or equal to the electricity-quantity threshold (step S301—No) (that is, the current remaining electricity quantity is less than the electricity-quantity threshold), the voltage determination circuit 23 disables the control signal S23 to control the charger 11 to inactivate a voltage turbo boost/buck (VTB) operation (step S302A) and control the underclocking control circuit 21 to activate a frequency control operation (step S302B) simultaneously. The voltage turbo boost/buck operation described herein comprises two voltage adjustment modes: voltage boosting and voltage bucking. When the voltage boosting is implemented, the supply circuit 110 increases the supply voltage of the power supplier 103 to be equal to the voltage (such as 19V) which is provided to the electronic device 10 by the supply circuit 110. When the voltage bucking is implemented, the supply circuit 110 decreases the voltage provided to the electronic device 10 to be equal to the supply voltage of the power supplier 103. In the embodiment, the voltage boosting operation is given as an example for illustration. When the voltage boosting operation is inactivated, the supply circuit 110 does not raise the supply voltage of the power supplier 103. Since the voltage provided to the electronic device 10 by the supply circuit 110 is higher than the supply voltage of the supply voltage of the power supplier 103, the electronic device 10 is powered only by the supply circuit 110 not by the power supplier 103. At this time, the supply circuit 110 of the charger 11 determines whether the real power consumption of the electronic device 10 is larger than or equal to a system rated power protection point (SDPP). In the embodiment, the system rated power protection point (SDPP) is set to be approximately equal to 85% of the rated output power (such as 45 W) of the power adaptor 12, that is 38 W. Referring to FIG. 4, in cases where the voltage boosting operation is inactivated, when the real power consumption of the electronic device 10 is larger than or equal to the system rated power protection point (SDPP, 85%), the supply circuit 110 only provides power to the electronic device 10, and, however, the supply circuit 110 does not charge the power supplier 103; when the real power consumption of the electronic device 10 is not larger than or equal to the system rated power protection point (SDPP, 85%) (that is, the real power consumption of the electronic device 10 is less than the system rated power protection point), the supply circuit 110 provides power to the electronic device 10, and the supply circuit 110 decides to charge the power supplier 103 or not according to the remaining electricity quantity of the power supplier 103. When frequency control operation is activated by the control signal S23, the underclocking control circuit 21 determines the control policy for controlling the operation frequencies of the central processor 104 and the graphics processor 105. The underclocking control circuit 21 generates the enabled or disabled underclocking control signal S21A according to the determined control policy to activate or inactivate the underclocking operation for the operation frequency of the central processor 104 through the OR gate 14. The underclocking control circuit 21 generates the enabled or disabled underclocking control signal S21B according to the determined control policy to activate or inactivate the underclocking operation for the operation frequency of the graphics processor 105 through the OR gate 15.

When the voltage determination circuit 23 determines that the current remaining electricity quantity of the power supplier 103 is larger than or equal to the electricity-quantity threshold (step S301—Yes), the voltage determination circuit 23 enables the control signal S23 to control the charger 11 to activate the voltage boosting operation (step S303A) and control the underclocking control circuit 21 to inactivate the frequency control operation (step S303B). In the embodiment, when the charger 11 activates the voltage boosting operation, the charger 11 also determines whether the real power consumption of the electrode device 10 is larger than or equal to the system rated power protection point (SDPP, 85%).

Referring to FIG. 4, in cases where the voltage boosting operation is activated, when the real power consumption of the electronic device 10 is larger than or equal to the system rated power protection point (SDPP, 85%), the supply circuit 110 provides power to the electronic device 10 (AC supply) and further increases the supply voltage of the power supplier 103 to be equal to the voltage which is provided to the electronic device 10 by the supply circuit 110. Accordingly, when the real power consumption of the electronic device 10 is larger than the system rated power protection point (SDPP, 85%), the short of the power is provided by the power supplier 103 (DC supply). When the real power consumption of the electronic device 10 is not larger than or equal to the system rated power protection point (SDPP, 85%), the supply circuit 110 provides power to the electronic device 10, and the supply circuit 110 decides whether to charges charge the power supplier 103 or not according to the remaining electricity quantity of the power supplier 103. When frequency control operation is inactivated, the underclocking control circuit 21 inactivates the underclocking operations for the operation frequencies of the central processor 104 and the graphics processor 105 through the disabled underclocking control signals S21A and S21B respectively. In other words, both of the central processor 104 and the graphics processor 105 do not reduce their operation frequencies.

Figure 5:
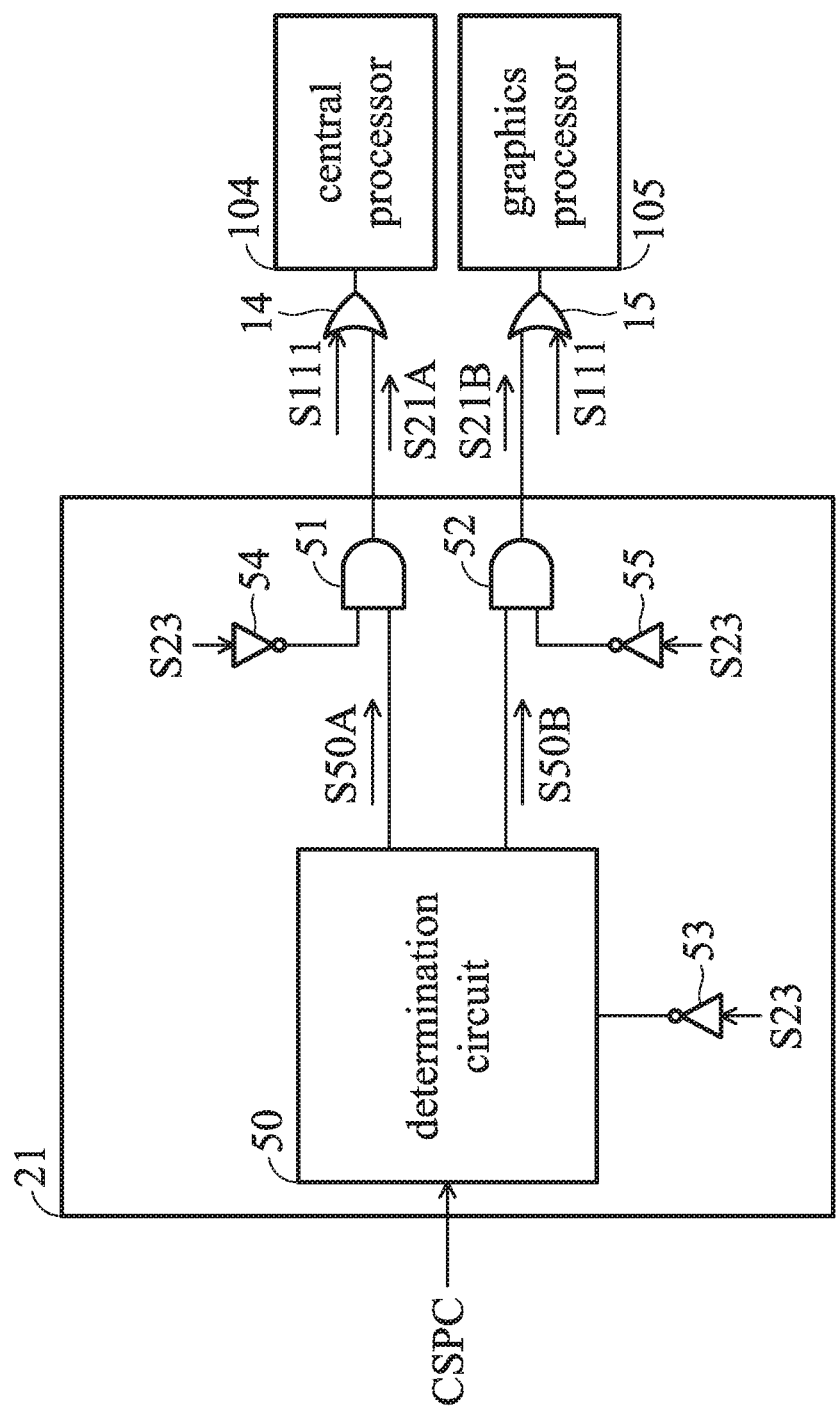
FIG. 5 shows an exemplary embodiment of an underclocking control circuit.
Figure 6A:
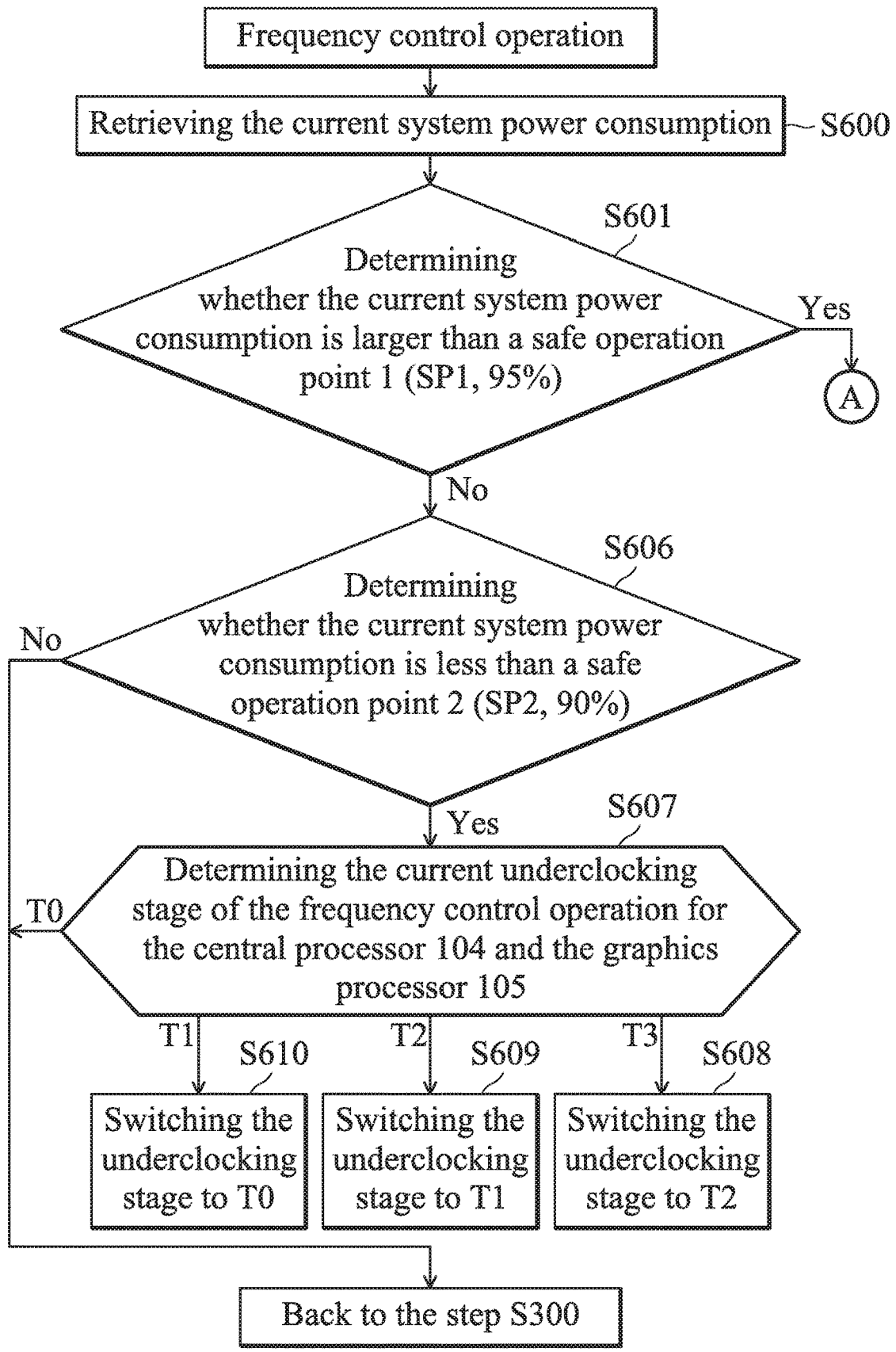
FIGS. 6A and 6B show a flow chart of an exemplary embodiment of a frequency control operation.
Figure 6B:
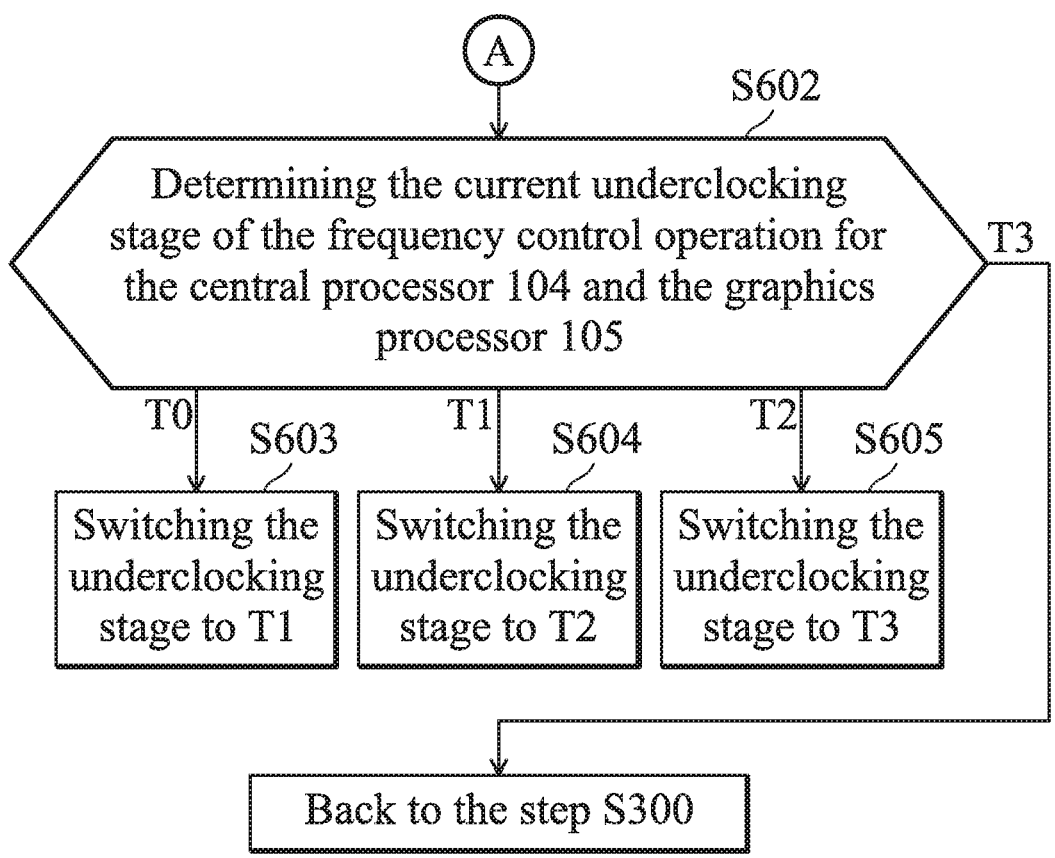

FIG. 5 shows an exemplary embodiment of the underclocking control circuit 21. The underclocking control circuit 21 comprises a determination circuit 50, AND gates 51 and 52, and inverters 53-55. The control signal S23 is transmitted to the determination circuit 50 through the inverter 53 for deciding to enable the frequency control operation or not. The control signal S23 is transmitted to one terminal of the AND gate 51 and one terminal of the AND gate 52 through the inverters 54 and 55 respectively. For clear illustration, FIG. 5 also shows the OR gates 14 and 15, the central processor 104, and the graphics processor 105. FIGS. 6A and 6B show a flow chart of an exemplary embodiment of the frequency control operation in the control method of FIG. 3. FIG. 7 shows various underclocking stages of the frequency control operation. In the embodiment, four underclocking stages T0~T3 are given as an example. At the underclocking stage T0, the underclocking operation for the operation frequency of the central processor 104 (underclocking for CPU) is inactivated, and the underclocking operation for the operation frequency of the graphics processor 105 (underclocking for GPU) is also inactivated. At the underclocking stage T1, the underclocking operation for the operation frequency of the central processor 104 (underclocking for CPU) is inactivated, while the underclocking operation for the operation frequency of the graphics processor 105 (underclocking for GPU) is activated. At the underclocking stage T2, the underclocking operation for the operation frequency of the central processor 104 (underclocking for CPU) is activated, while the underclocking operation for the operation frequency of the graphics processor 105 (underclocking for GPU) is inactivated. At the underclocking stage T3, the underclocking operation for the operation frequency of the central processor 104 (underclocking for CPU) is activated, and the underclocking operation for the operation frequency of the graphics processor 105 (underclocking for GPU) is also activated. Since the control policy for the operation frequencies of the central processor 104 and the graphics processor 105 is determined by the underclocking control circuit 21, the underclocking control circuit 21 can obtain the current state (activated or inactivated) of the underclocking operations for the operation frequencies of the central processor 104 and the graphics processor 105.

In the following, the control policy for the frequency control operation will be described by referring to FIGS. 5-7. When the disabled control signal S23 is provided to the determination circuit 50 through the inverter 53, the frequency control operation is activated, and the determination circuit 50 retrieves the current system power consumption (CSPC) of the electronic device 10 from the estimation circuit 20 (S600). The determination circuit 50 determines whether the current system power consumption (CSPC) is larger than a safe operation point 1 (SP1) (step S601). In the embodiment, the safe operation point 1 (SP1) is set to be 95% of the rated output power (such as 45 W) of the power adaptor 12, that is 43 W. When the determination circuit 50 determines that the current system power consumption (CSPC) is larger than the safe operation point 1 (SP1, 95%) (step S601—Yes), the determination circuit 50 determines the current underclocking stage of the frequency control operation for the central processor 104 and the graphics processor 105 (step S602). When the determination circuit 50 determines that the current underclocking stage is the stage T0 (step S602—T0), the determination circuit 50 decides to switch the underclocking stage to T1 from T0 (step S603). At this time, the determination circuit 50 generates a disabled selection signal S50A and an enabled selection signal S50B. After the disabled control signal S23 is inverted by the inverters 54 and 55, the inverters 54 and 55 generate enabled signals to the AND gates 51 and 52 respectively. Accordingly, the underclocking control signals S21A and S21B generated by the AND gates 51 and 52 change with the selection signals S50A and S50B respectively. Thus, the underclocking control S21A generated by the AND gate 51 is disabled, while the underclocking control S21B generated by the AND gate 52 is enabled. Since the protection signal S111 is pre-set at a disabled state, the OR gate 14 generates a disabled signal to control the central processor 104 to inactivate the underclocking operation for the operation frequency of the central processor 104, while the OR gate 15 generates an enabled signal to control the graphics processor 105 to activate the underclocking operation for the operation frequency of the graphics processor 105.

When the determination circuit 50 determines that the current underclocking stage is the stage T1 (step S602—T1), the determination circuit 50 decides to switch the underclocking stage to T2 from T1 (step S604). At this time, the determination circuit 50 generates the enabled selection signal S50A and the disabled selection signal S50B. Thus, the underclocking control S21A generated by the AND gate 51 is enabled, while the underclocking control S21B generated by the AND gate 52 is disabled. Since the protection signal S111 is pre-set at the disabled state, the OR gate 14 generates an enabled signal to control the central processor 104 to activate the underclocking operation for the operation frequency of the central processor 104, while the OR gate 15 generates a disabled signal to control the graphics processor 105 to inactivate the underclocking operation for the operation frequency of the graphics processor 105.

When the determination circuit 50 determines that the current underclocking stage is the stage T2 (step S602—T2), the determination circuit 50 decides to switch the underclocking stage to T3 from T2 (step S605). At this time, the determination circuit 50 generates the enabled selection signal S50A and the enabled selection signal S50B. Thus, the underclocking control S21A generated by the AND gate 51 is enabled, and the underclocking control S21B generated by the AND gate 52 is also enabled. Since the protection signal S111 is pre-set at the disabled state, the OR gate 14 generates an enabled signal to control the central processor 104 to activate the underclocking operation for the operation frequency of the central processor 104, and the OR gate 15 generates an enabled signal to control the graphics processor 105 to activate the underclocking operation for the operation frequency of the graphics processor 105.

When the determination circuit 50 determines that the current underclocking stage is the stage T3 (step S602—T3), the frequency control operation proceeds back to the step S600. According to the above embodiment, when the determination circuit 50 determines that the current system power consumption (CSPC) is larger than the safe operation point 1 (SP1, 95%) (step S601—Yes), the control policy for the underclocking of the frequency control operation is: underclocking stage T0→underclocking stage T1→underclocking stage T2→underclocking stage T3.

When the determination circuit 50 determines that the current system power consumption (CSPC) is not larger than the safe operation point 1 (SP1, 95%) (step S601—No), the determination circuit 50 determines whether the current system power consumption (CSPC) is less than a safe operation point 2 (SP2) (step S606). In the embodiment, the safe operation point 2 (SP2) is set to be 90% of the rated output power (such as 45 W) of the power adaptor 12, that is 38 W. When the determination circuit 50 determines that the current system power consumption (CSPC) is not less than the safe operation point 2 (SP2, 90%) (step S606—No), the frequency control operation proceeds back to the step S600. When the determination circuit 50 determines that the current system power consumption (CSPC) is less than the safe operation point 2 (SP1, 90%) (step S606—Yes), the determination circuit 50 determines the current underclocking stage of the frequency control operation for the central processor 104 and the graphics processor 105 (step S607). When the determination circuit 50 determines that the current underclocking stage is the stage T3 (step S607—T3), the determination circuit 50 decides to switch the underclocking stage to T2 from T3 (step S608). At this time, the determination circuit 50 generates the enabled selection signal S50A and the disabled selection signal S50B. Thus, the underclocking control S21A generated by the AND gate 51 is enabled, while the underclocking control S21B generated by the AND gate 52 is disabled. Since the protection signal S111 is pre-set at the disabled state, the OR gate 14 generates an enabled signal to control the central processor 104 to activate the underclocking operation for the operation frequency of the central processor 104, while the OR gate 15 generates a disabled signal to control the graphics processor 105 to inactivate the underclocking operation for the operation frequency of the graphics processor 105.

When the determination circuit 50 determines that the current underclocking stage is the stage T2 (step S607—T2), the determination circuit 50 decides to switch the underclocking stage to T1 from T2 (step S609). At this time, the determination circuit 50 generates the disabled selection signal S50A and the enabled selection signal S50B. Thus, the underclocking control S21A generated by the AND gate 51 is disabled, while the underclocking control S21B generated by the AND gate 52 is enabled. Since the protection signal S111 is pre-set at the disabled state, the OR gate 14 generates a disabled signal to control the central processor 104 to inactivate the underclocking operation for the operation frequency of the central processor 104, while the OR gate 15 generates an enabled signal to control the graphics processor 105 to activate the underclocking operation for the operation frequency of the graphics processor 105.

When the determination circuit 50 determines that the current underclocking stage is the stage T1 (step S607—T1), the determination circuit 50 decides to switch the underclocking stage to T0 from T1 (step S610). At this time, the determination circuit 50 generates the disabled selection signal S50A and the disabled selection signal S50B. Thus, the underclocking control S21A generated by the AND gate 51 is disabled, and the underclocking control S21B generated by the AND gate 52 is disabled. Since the protection signal S111 is pre-set at the disabled state, the OR gate 14 generates a disabled signal to control the central processor 104 to inactivate the underclocking operation for the operation frequency of the central processor 104, and the OR gate 15 generates a disabled signal to control the graphics processor 105 to inactivate the underclocking operation for the operation frequency of the graphics processor 105.

When the determination circuit 50 determines that the current underclocking stage is the stage T0 (step S607—T0), the frequency control operation proceeds back to the step S600. According to the above embodiment, when the determination circuit 50 determines that the current system power consumption (CSPC) is less than the safe operation point 2 (SP2, 90%) (step S606—Yes), the control policy for the underclocking of the frequency control operation is: underclocking stage T3→underclocking stage T2→underclocking stage T1→underclocking stage T0.

As described above, when the voltage determination circuit 23 determines that the current remaining electricity quantity of the power supplier 103 is larger than or equal to the electricity-quantity threshold (step S301—Yes), the voltage determination circuit 23 enables the control signal S23. In the embodiment of FIG. 5, after the enabled control signal S23 is inverted through the inverters 54 and 55, the inverters 54 and 55 generate disabled signals to the AND gates 51 and 52 respectively. Accordingly, no matter what the states of the selection signals S50A and S50B are, the underclocking control signals S21A and 21B respectively generated by the AND gates 51 and 52 are always disabled. Through the disabled signals respectively output from the OR gates 14 and 15, each of the central processor 104 and the graphics processor 105 inactivates the underclocking operation for the corresponding operation frequency. In other words, the underclocking stage is T0.

According to the above embodiments, the over-power protection mechanism disclosed in the invention is achieved by using the underclocking policy and the power protection point (PP). The power protection point (PP) is set to be 120% of the rated output power (such as 45 W) of the power adaptor 12. In the cases where the real power consumption is larger than or equal to the power protection point (PP, 120%), since the protection signal S111 is enabled, the OR gates 14 and 15 generate the enabled signals to control the central processor 104 and the graphics processor 105 to activate the underclocking operations for respective operation frequencies respectively for achieving the over-power protection. In the cases where the real power consumption is not larger than or equal to the power protection point (PP, 120%) (that is, the real power consumption is less than the power protection point (PP, 120%)), since the protection signal S111 is pre-set to the disable state, the states of the signals output from the OR gates 14 and 15 are determined according to the states of the underclocking control signals S21A and S21B which are generated in response to the control policy for the frequency control operation, thereby achieving the over-power protection.

Moreover, the electronic system 1 can provide power to satisfy the demand for the high power-consumption of the electronic device 10 through performing the voltage boosting operation on the power supplier 103 by the charger 11 and keep the original performance of the electronic device 10. Accordingly, the effect, which is induced by the transient noise related to the transient response, on the over-power protection mechanism can be omitted.

According to the embodiment of FIG. 7, at the underclocking stage T1, the underclocking operation for the central processor 104 (underclocking for CPU) is inactivated, while the underclocking operation for the graphics processor 105 (underclocking for GPU) is activated; at the underclocking stage T2, the underclocking operation for the central processor 104 (underclocking for CPU) is activated, while the underclocking operation for the graphics processor 105 (underclocking for GPU) is inactivated. However, in other embodiments, the states of the underclocking for CPU and the underclocking for GPU at the underclocking stage T1 can be exchanged with the states of the underclocking for CPU and the underclocking for GPU at the underclocking stage T2. In details, at the underclocking stage T1, the underclocking operation for the central processor 104 (underclocking for CPU) is activated, while the underclocking operation for the graphics processor 105 (underclocking for GPU) is inactivated; at the underclocking stage T2, the underclocking operation for the central processor 104 (underclocking for CPU) is inactivated, while the underclocking operation for the graphics processor 105 (underclocking for GPU) is activated.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, coupled to a charger which chares the electronic device according to power from a power adaptor, comprising:
   a first processor;
   a power supplier storing electricity to provide power to the electronic device; and
   a controller detecting remaining electricity quantity of the power supplier and determining whether the current remaining electricity quantity is larger than an electricity-quantity threshold,
   wherein when the controller determines that the current remaining electricity quantity is not larger than the electricity-quantity threshold, the controller activates a frequency control operation to control an operation frequency of the first processor, and
   wherein when real power consumption of the electronic device is larger than a rated output power of the power adaptor, the controller activates an underclocking operation for the operation frequency of the first processor for achieving over-power protection.

2. The electronic device as claimed in claim 1, wherein when the controller activates the frequency control operation, the controller decides to decrease the operation frequency of the first processor or not according to current system power consumption of the electronic device.

3. The electronic device as claimed in claim 1, further comprising:
   a second processor,
   wherein when the controller determines that the current remaining electricity quantity is not larger than the electricity-quantity threshold, the controller activates the frequency control operation to control an operation frequency of the second processor, and
   wherein when the controller activates the frequency control operation, the controller determines control policy according to current system power consumption of the electronic device to control the operation frequency of the first processor and the operation frequency of the second processor.

4. The electronic device as claimed in claim 3, wherein when the current system power consumption is larger than a first safe operation point, the controller activates a underclocking operation for the operation frequency of at least one of the first and second processors according to the control policy, and when the current system power consumption is less than a second safe operation point, the controller inactivates the underclocking operation for the operation frequency of at least one of the first and second processors according to the control policy, the first safe operation point is higher than the second safe operation point.

5. The electronic device as claimed in claim 3, wherein the first processor is a central processor, and the second processor is a graphics processor.

6. The electronic device as claimed in claim 3, wherein when real power consumption of the electronic device is larger than the rated output power, the controller activates an underclocking operation for the operation frequency of the second processor for achieving over-power protection, and
wherein the controller obtains the current system power consumption according to the real power consumption of the electronic device and a static compensation value.

7. An electronic system comprising:
an electronic device comprising:
a first processor;
a power supplier storing electricity to provide power to the electronic device; and
a controller detecting remaining electricity quantity of the power supplier and determining whether the current remaining electricity quantity is larger than an electricity-quantity threshold to generate a control signal; and
a power adaptor having a rated output power;
a charger, coupled to the power adaptor, providing power to the electronic device according to power from the power adaptor and activating or inactivating a voltage turbo boost/buck operation, which is performed on the electronic device, according to the control signal;
wherein when the controller determines that the current remaining electricity quantity is not larger than the electricity-quantity threshold, the controller generates the control signal to inactivate the voltage turbo boost/buck operation and activate a frequency control operation to control an operation frequency of the first processor,
wherein the charger determines whether real power consumption of the electronic device is larger than the rated output power, and
wherein when the charger determines that the real power consumption of the electronic device is larger than the rated output power, the charger generates a protection signal to the electronic device, and the controller activates an underclocking operation for the operation frequency of the first processor according to the protection signal for achieving over-power protection.

8. The electronic system as claimed in claim 7, wherein when the controller activates the frequency control operation, the controller decides to decrease the operation frequency of the first processor or not according to current system power consumption of the electronic device.

9. The electronic system as claimed in claim 7 wherein the electronic device further comprises:
a second processor,
wherein when the controller determines that the current remaining electricity quantity is not larger than the electricity-quantity threshold, the controller activates the frequency control operation to control an operation frequency of the second processor, and
wherein when the controller activates the frequency control operation, the controller determines control policy according to current system power consumption of the electronic device to control the operation frequency of the first processor and the operation frequency of the second processor.

10. The electronic system as claimed in claim 9, wherein when the current system power consumption is larger than a first safe operation point, the controller activates an underclocking operation for the operation frequency of at least one of the first and second processors according to the control policy, and when the current system power consumption is less than a second safe operation point, the controller inactivates the underclocking operation for the operation frequency of at least one of the first and second processors according to the control policy, the first safe operation point is higher than the second safe operation point.

11. The electronic system as claimed in claim 9, wherein the first processor is a central processor, and the second processor is a graphics processor.

12. The electronic system as claimed in claim 9, wherein when the charger determines that the real power consumption of the electronic device is larger than the rated output power, the charger generates the protection signal to the electronic device, and the controller activates an underclocking operation for the operation frequency of the second processor according to the protection signal for achieving over-power protection, and
wherein the controller retrieves the real power consumption of the electronic device from the charger and obtains the current system power consumption according to the real power consumption of the electronic device and a static compensation value.

13. The electronic system as claimed in claim 7, wherein when the controller determines that the current remaining electricity quantity is larger than the electricity-quantity threshold, the controller generates the control signal to activate the voltage turbo boost/buck operation and inactivate the frequency control operation.

14. A control method for an electronic device coupled to a charger, the charger providing power to the electronic device according to the power from a power adaptor, comprising:
detecting remaining electricity quantity of a power supplier of the electronic device;
determining whether the current remaining electricity quantity is larger than an electricity-quantity threshold;
activating a frequency control operation to control operation frequencies of a plurality of processors of the electronic device when the current remaining electricity quantity is not larger than the electricity-quantity threshold;
determining whether real power consumption of the electronic device is larger than a rated output power of the power adaptor; and
in response to determining that the real power consumption of the electronic device is larger than the rated output power, activating an underclocking operation for the operation frequency of each of the plurality of processors for achieving over-power protection.

15. The control method as claimed in claim 14, further comprising:

inactivating a voltage turbo boost/buck operation, which is performed on the electronic device when the current remaining electricity quantity is not larger than the electricity-quantity threshold.

16. The electronic method as claimed in claim 14, wherein the step of activating a frequency control operation to control operation frequencies of a plurality of processors of the electronic device when the current remaining electricity quantity is not larger than the electricity-quantity threshold comprises:

obtaining current system power consumption of the electronic device;

determining whether the current system power consumption is larger than a first safe operation point; and activating an underclocking operation for the operation frequency of at least one of the plurality of processors when the current system power consumption is larger than the first safe operation point.

17. The control method as claimed in claim 16, wherein the step of activating a frequency control operation to control operation frequencies of a plurality of processors of the electronic device when the current remaining electricity quantity is not larger than the electricity-quantity threshold further comprises:

determining whether the current system power consumption is less than a second safe operation point when the current system power consumption is not larger than the first safe operation point, wherein the first safe operation point is higher than the second safe operation point; and inactivating the underclocking operation for the operation frequency of at least one of the plurality of processors when the current system power consumption is less than the second safe operation point.

18. The control method as claimed in claim 14, further comprising:

activating the voltage turbo boost/buck operation when the current remaining electricity quantity is larger than the electricity-quantity threshold.

19. The control method as claimed in claim 18, further comprising:

inactivating the frequency control operation when the current remaining electricity quantity is larger than the electricity-quantity threshold.

20. The control method as claimed in claim 16, wherein the current system power consumption is obtained according to the real power consumption of the electronic device and a static compensation value.

* * * * *